Feb. 17, 1959   S. E. W. ORTE ET AL   2,874,008
BEARING MOUNTING FOR SILENT RUNNING ROTATING MACHINE PARTS
Filed Feb. 13, 1957

INVENTORS:
SVEN ERIK WILNER ORTE
RAGNAR KINBERG
BY Howson & Howson
ATTYS.

United States Patent Office 2,874,008
Patented Feb. 17, 1959

2,874,008

BEARING MOUNTING FOR SILENT RUNNING ROTATING MACHINE PARTS

Sven Erik Wilner Orte and Ragnar Kinberg, Goteborg, Sweden, assignors to Aktiebolaget Svenska Kullagerfabriken, Goteborg, Sweden, a corporation of Sweden Application February 13, 1957, Serial No. 639,924

Claims priority, application Sweden February 23, 1956

4 Claims. (Cl. 308—184)

In rotating machine parts for use under certain conditions where silent running is required, for example motors for driving fans, circulating pumps for heating systems and household appliances it has been common to use plain bearings instead of ball bearings since it has been found that ball bearings mounted in a normal manner are not sufficiently silent even when they are mounted with the greatest of care and the bearings themselves are of highest quality. Many different suggestions for mounting the bearings in order to deaden the noise have been made. These suggestions have usually entailed the use of a layer of rubber or the like, applied between the racerings of the bearing and the frame of the machine. None of the devices according to these prior suggestions has, however, been completely satisfactory, either because the desired deadening of the sound has not been attained or because the structure has not been sufficiently rigid in a radial direction, with the result that when used in electric motors the gap between the rotor and the stator either is not that desired or cannot be maintained constant.

Figure 1:
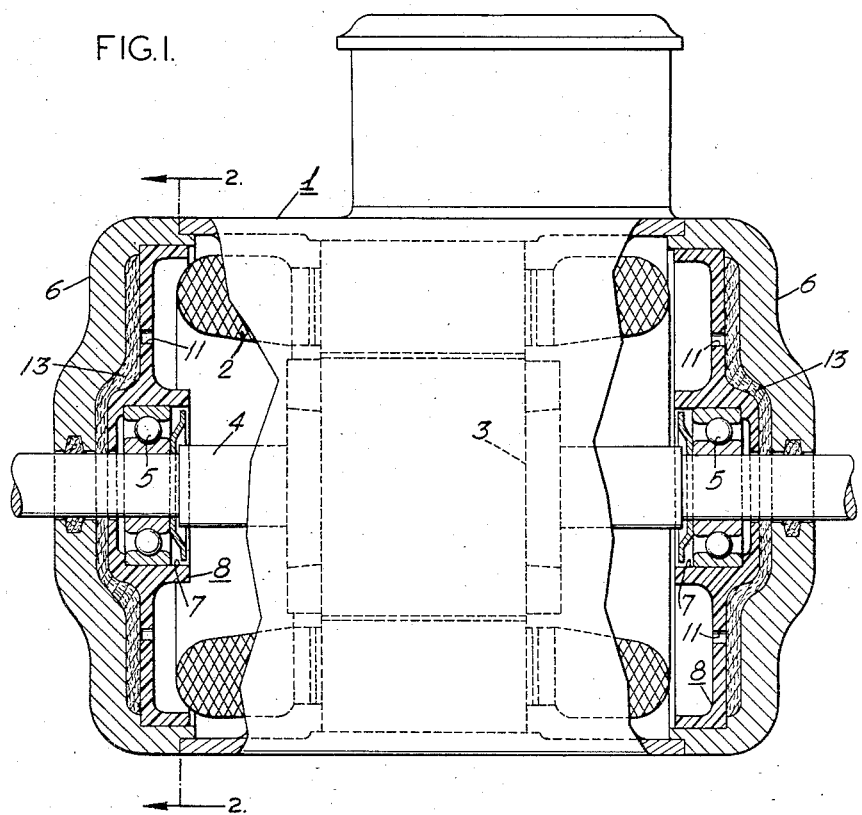

The present invention, of which the accompanying drawing illustrates a form as applied to an electric motor has been found to give such satisfactory results that a ball bearing equipped motor can be made to run as silently as a motor with plain bearings. Fig. 1 shows an axial section through a motor with a mounting according to the invention and Fig. 2 shows a side view of a form of mounting for the bearing.

In Fig. 1 the numeral 1 designates the frame of an electric motor, the stator windings of which are designated 2. Within the stator is located the rotor 3 mounted on a shaft 4 which rotates in ball bearings 5 mounted at the ends of the stator. Instead of mounting the bearings in seats in the shields 6 as is the usual practice the bearings are according to the invention mounted in seats 7 formed in substantially plane disks or membranes 8 relatively rigid in a radial direction disposed within the shields. These members are made of a plastic, for instance nylon, or of a metal coated on at least one side with plastic. The members 8, the outer diameters of which are comparatively great as compared to the diameter of the bearing are provided at their outer circumferences with cylindrical flanges fitting into seats in the shields. The outer edges of the members 8 should preferably be set slightly towards each other, whereby the bearings will be subjected to a slight thrust sufficient to eliminate play in the bearings.

Figure 2:
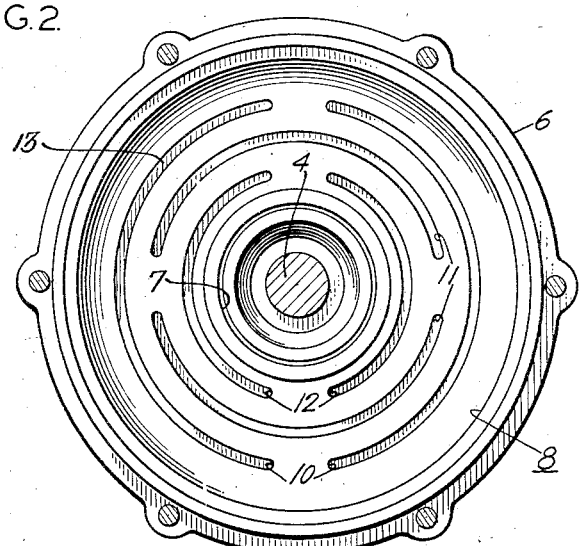

The capacity of the members 8 to deaden sound can be increased by providing them with perforations which may be arranged in concentric series as shown in Fig. 2. The perforations in the three series, 10, 11 and 12 may be arranged, as shown in the figure, staggered relative to the adjacent series, whereby the flexibility of the disks is increased and their sound deadening capacity is improved since the direct transmission of vibrations towards the periphery is interrupted and the distance between the bearing and the metallic parts of the motor is further extended. Since the perforations increase the flexibility of the disk the bearings will not be subjected to skewing forces which would impair their running. The perforations may have any suitable form and may be so arranged that the remaining portions of the disk may more or less resemble spokes.

The mounting member described above has several desirable qualities. It is comparatively rigid in a radial direction despite the perforations. It can be set to eliminate play in the bearings and it has great sound deadening capacity.

The sound emanating from the disk and the bearing can be further deadened by applying a layer of felt or the like between the mounting member and the shield as shown at 13. The felt can also serve to stiffen the mounting axially if so desired.

The shields, which are located outside the members 8 also serve to deaden and cut off the sound.

The members 8 can, if desired, be made of a suitable metal which is coated on at least one side with a sound-absorbing plastic material.

In certain cases it may also be desirable to insert a thin sound deadening layer of for instance rubber or cork between the mounting members 8 and the shields 6 or the frame 1 to further deaden the sound.

We claim:

1. In a bearing mounting for the rotors of electric machines having a frame forming a rotor chamber and including end shields excluding foreign matter from said chamber, a shaft for the rotor intersecting one at least said shields, a radially stiff plastic disk located at each end of the frame inwardly of the respective shields and supported at its outer peripheral edge in a portion of the frame remote from the shaft axis, a bearing seat in each of the plastic disks, and rolling bearings mounted in and finding their sole supports in said seats and constituting themselves the sole supports for the shaft in the frame.

2. A bearing mounting according to claim 1 characterized thereby that the disk is provided with perforations preferably arranged in series on concentric circles.

3. A bearing mounting according to claim 2 characterized thereby that the perforations in the different series are staggered relative to the perforations in the adjacent series.

4. A bearing mounting according to claim 1 characterized thereby that a layer of sound deadening material is disposed between the disk and the shield.

References Cited in the file of this patent

UNITED STATES PATENTS

| | | |
|---|---|---|
| 2,521,638 | Lamm | Sept. 5, 1950 |
| 2,614,896 | Pierce | Oct. 21, 1952 |